(12) United States Patent
Holder

(10) Patent No.: US 6,364,257 B1
(45) Date of Patent: Apr. 2, 2002

(54) VEHICLE SERVICE LINE RETAINER SYSTEM

(75) Inventor: Danny D. Holder, Kernersville, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 09/590,952

(22) Filed: Jun. 9, 2000

(51) Int. Cl.⁷ ................................................ F16L 3/08
(52) U.S. Cl. ................. 248/74.3; 248/68.1; 248/74.1; 24/16 PB; 24/30.5 P
(58) Field of Search ............................. 248/74.3, 68.1, 248/74.1, 74.4; 24/16 PB, 30.5 P

(56) References Cited

U.S. PATENT DOCUMENTS

| | | | |
|---|---|---|---|
| 2,440,469 A | 4/1948 | Goddard | 248/68.1 |
| 3,173,987 A | 3/1965 | Potruch | 174/52.1 |
| 3,188,138 A | 6/1965 | Lockshin | 297/248 |
| 3,649,998 A | 3/1972 | Fiorentino | 408/188 |
| 3,654,669 A | 4/1972 | Fulton | 24/16 PB |
| 3,981,048 A | 9/1976 | Moody et al. | 24/16 PB |
| 4,136,913 A | 1/1979 | Pietzsch et al. | 305/204 |
| 4,183,485 A | 1/1980 | Gladieux | 248/68.1 |
| 4,910,831 A * | 3/1990 | Bingold | 24/16 PB |
| 4,925,136 A * | 5/1990 | Knott | 248/62 |
| 5,088,158 A | 2/1992 | Burkholder | 24/16 PB |
| 5,159,728 A * | 11/1992 | Bingold | 24/16 PB |
| D347,156 S | 5/1994 | Starrett et al. | D29/120.2 |
| 5,398,383 A * | 3/1995 | Bingold | 24/16 PB |
| 5,755,013 A | 5/1998 | Fitch et al. | 24/16 PB |
| D395,001 S | 6/1998 | Stebbins | D8/394 |
| 5,802,888 A | 9/1998 | Parsons | 70/16 |
| 5,941,483 A | 8/1999 | Baginski | 248/68.1 |
| 5,966,781 A | 10/1999 | Geiger | 24/16 PB |
| 6,219,887 B1 * | 4/2001 | Parsons | 24/16 PB |
| 6,240,602 B1 * | 6/2001 | Geiger | 24/16 PB |

* cited by examiner

Primary Examiner—Ramon O. Ramirez
Assistant Examiner—Holly N. Sy
(74) Attorney, Agent, or Firm—Watts, Hoffmann, Fisher & Heinke Co., L.P.A.

(57) ABSTRACT

An improved brake line positioning arrangement for over-the-highway trucks and tractors is disclosed. The arrangement includes a unitary retainer having a spaced pair of flexible toothed straps and a central body interposed between and connected to the straps. The body includes a spaced pair of strap receiving slots, a pair of tooth engaging projections respectively projecting into the slots for strap retention engagement with the strap teeth. The straps surround and retentatively engage each of a spaced pair of brake service lines and thereby retentatively engage the lines. ABS conductors are also connected to the retainer.

20 Claims, 3 Drawing Sheets

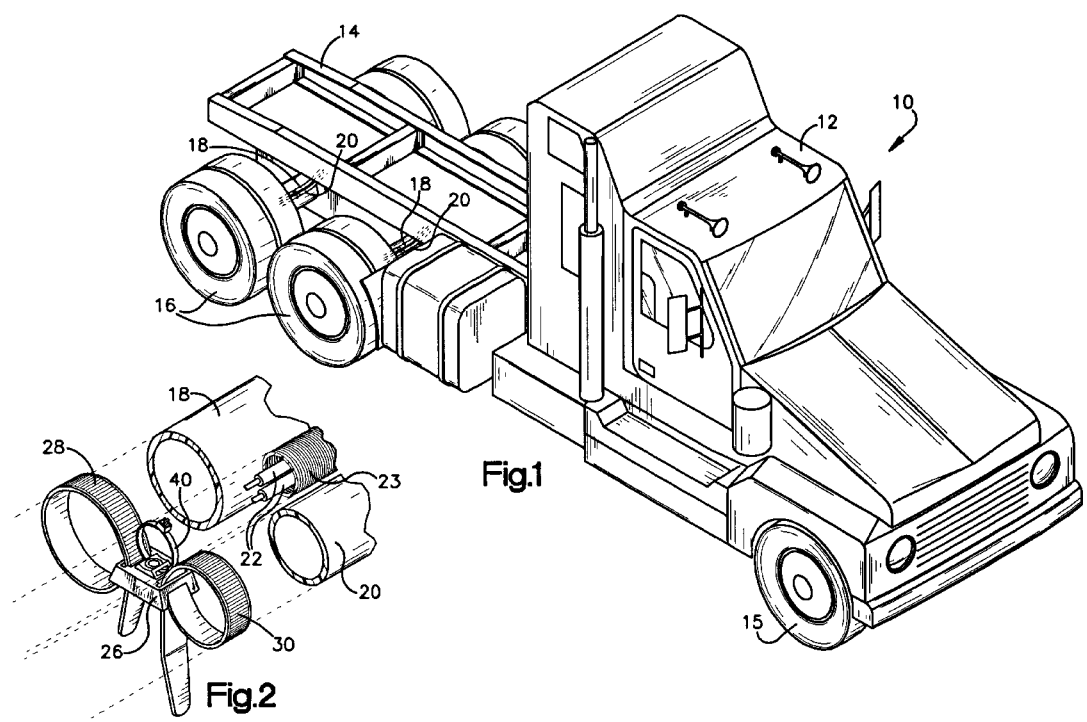

US 6,364,257 B1

VEHICLE SERVICE LINE RETAINER SYSTEM

TECHNICAL FIELD

This invention relates to a method and apparatus for securing vehicle service lines in desired relative positions and more particularly to mechanism and apparatus for securing brake service lines in over-the-highway trucks and tractors.

BACKGROUND ART

Vehicles are equipped with flexible service lines which extend between a vehicle body and/or a vehicle frame and vehicle suspension systems. In over-the-highway trucks and tractors, there typically are air lines which extend along the vehicle frame to a location near each of the wheels and two flexible lines which extend from the frame to each wheel. One of the lines is a line which is normally pressurized when the vehicle is in use to maintain socalled spring brakes or parking brakes in an off condition against the biasing of springs which automatically apply the brakes when air pressure is released. The other line is to service brakes for arresting a vehicle motion under operator control.

Heretofore there has been no truly satisfactory solution to maintaining such flexible brake lines appropriately positioned. For example, brake hose clips have been used to secure such lines in place. Such clips may cause wearing and premature failing of a secured line. In addition, no provision is made for interconnecting pairs of brake lines in desired spatial relationship.

Automatic brake systems (ABS) are frequently installed in modem over-the-highway vehicles. These systems sense wheel lock up which will cause skidding and release brake pressure momentarily to assure maximized motion arresting while wheels continue to rotate rather than skid. Desirably ABS lines like the air lines, should be maintained in desired relative positions free of abrasion causing contact with vehicle components and potential resulting breakage.

U.S. Pat. No. 5,941,483 issued Aug. 24, 1998 to Frank Baginski entitled Service Line Clamp With Cable Mount discloses a highly successful arrangement which secures service lines to frames. Neither the Baginski arrangement or the other prior arrangements has adequately solved the problem of maintaining spatial relationships between sections of service lines such as those which span between a frame and a vehicle's wheels.

SUMMARY OF INVENTION

A unitary retainer for service lines to maintain such lines in desired positions and minimize wear and excessive flexing is provided. The retainer when installed maintains a pair of service lines such as brake air lines running to wheels in desired spatial relationship, thereby minimizing flexing and abrasive wear due to contact with one another and other components of a vehicle.

The retainer is a unitary molded plastic device preferably made of 6—6 nylon. The retainer includes a central body and a spaced pair of straps secured to the body. Each of the straps has a toothed surface. The body has a pair of spaced strap receiving slots for respectively receiving end portions of the straps. Projections within the slots selectively and flexibly engage the teeth such that the straps may be fed through in tightening relationship but are retained in a service line gripping relationship by the projections.

Unlike prior toothed restrainers, the teeth of the straps of the present retainers are formed on a surface which is an outer surface when the retainer is in use. Thus, as an example, if the strap is retainingly wrapped around an air line, the strap surface engaging the line is a smooth surface. This smooth surface to air line engagement inhibits wear if there is relative motion between the straps and the lines. Moreover, since there is smooth surface to surface engagement, there are no interstices where foreign particles can collect and cause abrasive wear if there is movement of the strap relative to the line being engaged as has characterized prior art toothed strap line retention devices.

The body includes a second pair of recesses through which an independent tie may be fed, to, for example, secure ABS lines to the retainer.

A typical proposed application of the retainer of this invention is in air services lines running from an over-the-highway truck or tractor frame to wheels mounted on a rear axle. In such an application a pair of the retainers will be used. One retainer of the pair will secure the air lines together at a location about one third the distance from the frame to the wheels being served, while the second retainer will be positioned at about two thirds of the distance from the frame to the wheels.

If the over-the-highway vehicle has an ABS system, ABS electrical conductors are preferably also secured to the retainers.

Accordingly, the objects of the invention are to provide a novel and improved service line positioning system and a retainer for such a system.

BRIEF DESCRIPTION OF DRAWINGS

FIG. 1 is a somewhat schematic view of an over-the-highway truck or tractor equipped with the service line retainers of the present invention;

FIG. 2 is an exploded view showing the retainers of the present invention on service lines of the vehicle of FIG. 1;

DESCRIPTION OF THE PREFERRED EMBODIMENT

Figure 3:
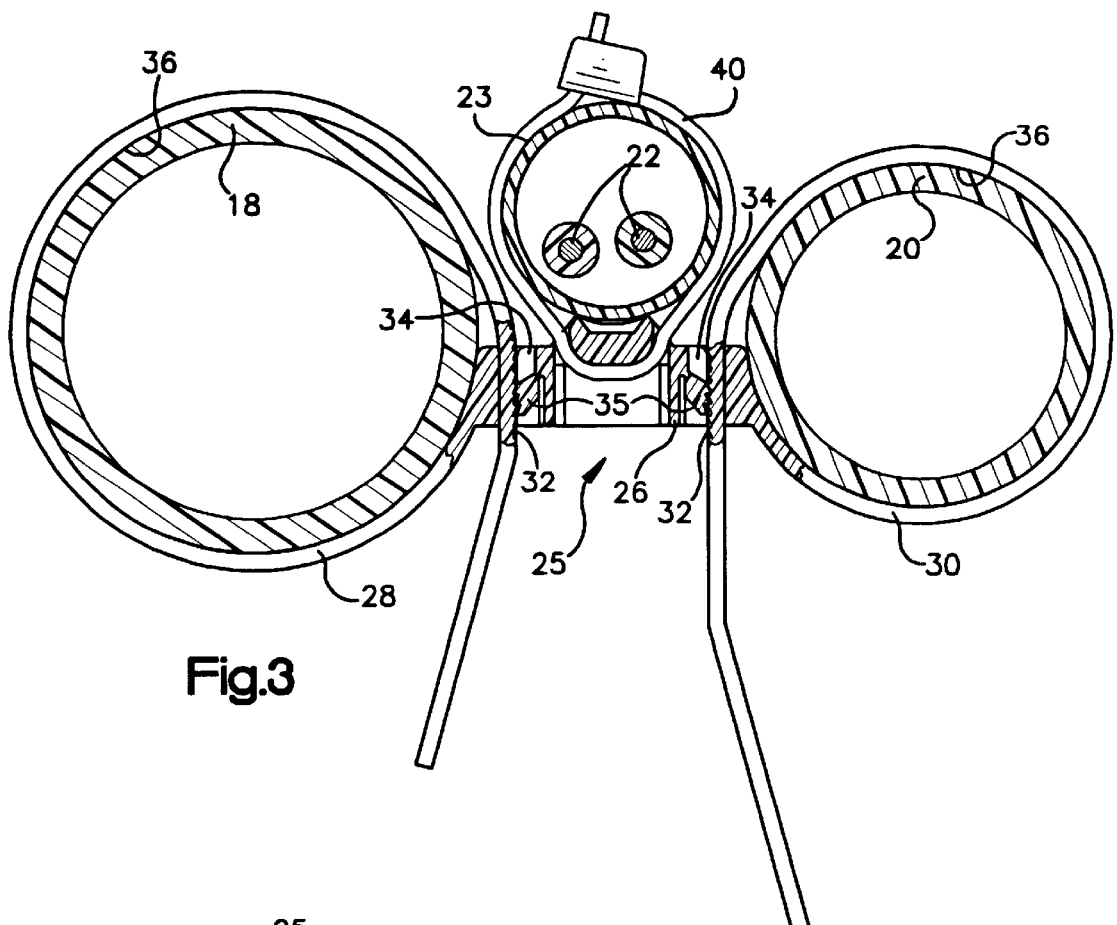
FIG. 3 is a sectional view of the retainer of the present invention and connected service lines.
Figure 4:
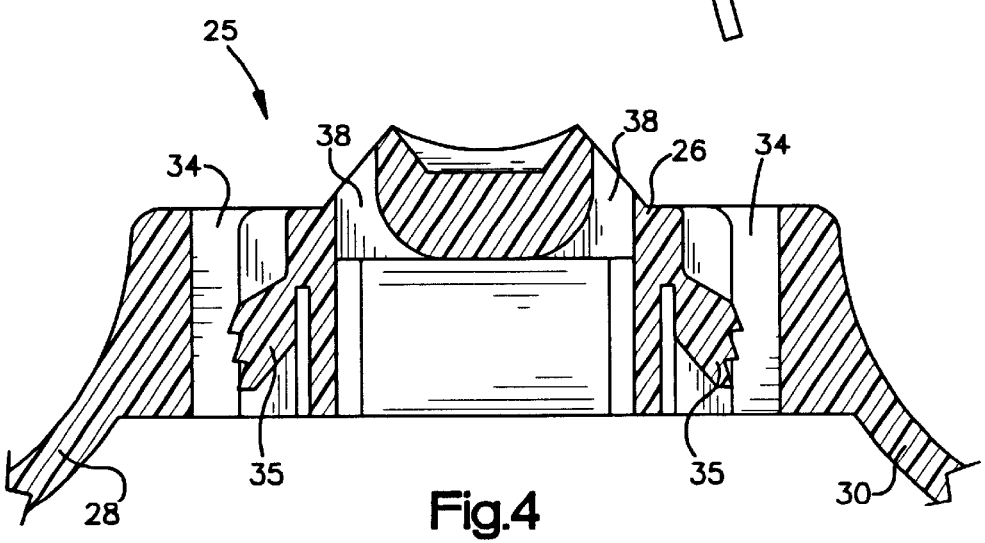
FIG. 4 is an enlarged sectional view of the retainer body and fore-shortened sections of the two straps connected to the body.

Referring now to the drawings and to FIG. 1 in particular, a vehicle in the form of an over-the-highway truck or tractor is shown generally at 10. The vehicle 10 has an operator cab 12 mounted on a vehicle frame 14. The usual front steerable wheels 15 and rear drive wheels 16 are provided.

A pair of service lines in the form of air lines for brake lines 18, 20 are provided as shown in FIGS. 2 and 3. Similarly ABS lines 22 encased in a tubular shield 23 are provided. The lines 18,20,22 and the shield 23 extend from the frame 14 to a brake system associated with one of the rear drive wheels 16.

The improved retainer of the present invention is shown generally at 25. The retainer 25 is a unitary molded device. The retainer includes a central body portion 26 and opposed, oppositely extending straps 28,30. The straps each include a plurality of teeth 32 formed in the surface which is the underside of the strap as viewed in FIGS. 5 and 6 and external as viewed in FIG. 2.

The body includes a pair of strap receiving slots 34 through which the straps 28,30 project as is best seen in FIG. 3. Toothed strap locking projections 35 respectively project into the slots 34 to retentively engage the teeth 32 of the straps as is best seen in FIG. 3. As an analysis of FIG. 3 will show, the strap teeth and the teeth of the projections 35 are oriented such that relative movement of the straps through the slots 34 is unidirectional, tightening movement.

Figure 5:
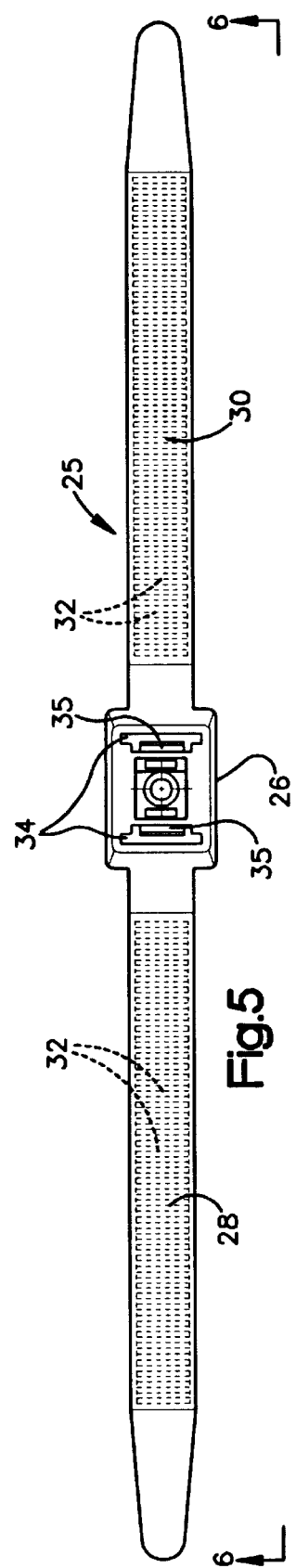
FIG. 5 is an view of the retainer of the present invention.
Figure 6:
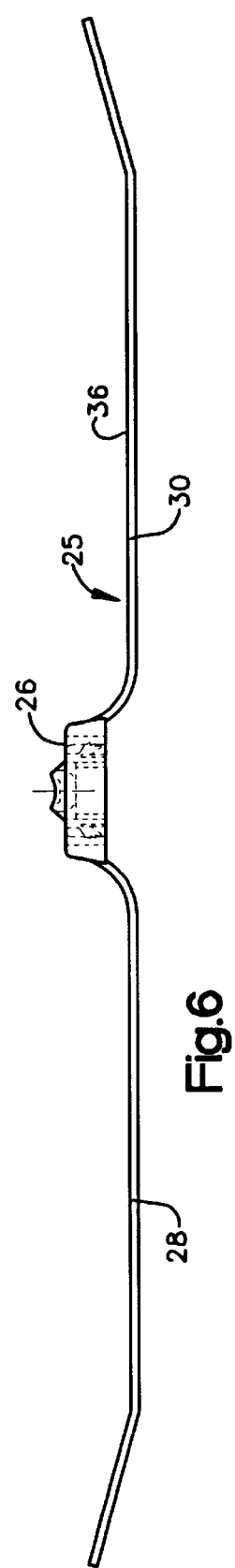
FIG. 6 is a side elevational view of the retainer of this invention on the scale of FIG. 5.

One outstanding feature of the present invention is that the strap teeth 32 are on a surface which is an external surface when the straps are around the lines 18,20. Thus, the straps have a smooth surface 36, which is the surface against the lines 18,20 as shown in FIG. 3, and the upper strap surface as seen in FIG. 5. As contrasted with prior flexible tie arrangements for vehicles, the provisions of the teeth on an external surface avoids spaces between the strap and a connected service line in which abrasive foreign particles can collect and cause needless wear.

The body also includes a pair of retainer receiving slots 38. The slots 38 optionally receive a tie 40 which, in the embodiment shown, anchors the pair of ABS lines 22 in position.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and scope of the invention as hereinafter claimed.

What is claimed is:

1. In an over the highway truck or tractor the improvement comprising a brake line positioning arrangement defined by:
   a) a unitary retainer including a spaced pair of flexible toothed straps and a central body interposed between and connected to the straps;
   b) the body including a spaced pair of strap receiving slots; and
   c) the body further including a pair of tooth engaging projections respectively projecting into the slots for strap retention engagement with the strap teeth whereby the straps may surround and retentively engage each of a spaced pair of brake service lines and thereby retentively engage the lines.

2. The arrangement of claim 1 wherein the body further defines at least one space for retentatively attaching a conductor of an automatic brake system.

3. The arrangement of claim 1 wherein the retainer is a molded plastic.

4. The arrangement of claim 3 wherein the plastic is nylon.

5. The arrangement of claim 1 wherein the strap teeth project outwardly when the arrangement is in use.

6. In a vehicle having a pair of brake service lines for delivering fluid under pressure to a brake system for the wheels of the vehicles, the improvement comprising an arrangement connecting the lines together to maintain the lines in a desired relative position, the arrangement comprising:
   a) a central body;
   b) a spaced pair of line retention straps secured to and projecting from opposite sides of the body;
   c) the straps each being disposed around and retentatively engaging a different and an associated one of the lines; and
   d) the straps each having an end portion retentatively engaging the body whereby to retain the straps in their retentatively engaging relationship with the lines.

7. The arrangement of claim 6 wherein the straps are toothed and project through respective slots in the body and wherein the body has tooth engaging projections in each of the slots.

8. The arrangement of claim 7 wherein the teeth of the straps project outwardly and each of the straps has an opposed smooth surface engaging the associated service lines.

9. The arrangement of claim 6 wherein the body further defines at least one space for retentatively attaching a conductor of an automatic brake system to the body.

10. The arrangement of claim 6 wherein the body and the straps are a unitary retainer.

11. The arrangement of claim 10 wherein the retainer is a molded plastic.

12. The arrangement of claim 11 wherein the plastic is nylon.

13. In a wheeled vehicle the improvement comprising a service line positioning system defined by:
   a) a retainer having a central body;
   b) the retainer also including a pair of toothed straps secured to opposite sides of the body,
   c) the body including a spaced pair of strap receiving slots extending through the body;
   d) the body also including a pair of strap retention projections respectively extending into the slots, the projections each including at least one strap retention tooth;
   e) each of the straps being in circumscribing relationship with a different and associate one of the service lines;
   f) the straps each having a smooth surface opposite the strap's toothed surface;
   g) the smooth surfaces each being in position retention engagement with the associated one of the service lines; and,
   h) each of said at least one strap at least one retention tooth being in position retention engagement with a coacting tooth of an associated one of strap whereby to provide a system retaining the service lines in predetermined spaced relationship.

14. The system of claim 13 wherein the retainer is a unitary molded plastic piece.

15. The system of claim 13 wherein the body includes a further pair of slots and a tie projects through the further slots and secures at least one further service line to the retainer.

16. The system of claim 15 wherein the service lines are brake air lines and automatic brake system conductors.

17. The system of claim 13 wherein the service lines are brake air lines.

18. For use in a wheeled vehicle, an improved service line positioner comprising:
   a) a retainer having a central body;
   b) the retainer also including a pair of toothed straps secured to opposite sides of the body;
   c) the body including a spaced pair of strap receiving slots extending through the body;
   d) the body also including a pair of strap retention projections respectively extending into the slots, the projections each including at least one strap retention tooth;
   e) each of the straps being adapted for circumscribing relationship with a different and associate one of the service lines;
   f) each of said at least one strap at least one retention tooth being adapted for position retention engagement with a coacting tooth of an associated one of straps whereby to provide a positioner for retaining the service lines in predetermined spaced relationship; and,
   g) a third strap connected to the body to retain a further service line in position when the positioner is in use.

19. The positioner of claim 18 wherein the retainer is a unitary molded plastic piece.

20. The positioner of claim 18 wherein the body includes a further pair of slots and the third strap is adapted to project through the further slots to secure the further service line to the positioner.

* * * * *